Sept. 10, 1929.  C. H. STERLING  1,727,795
OVERGEAR TRANSMISSION
Filed Jan. 15, 1927
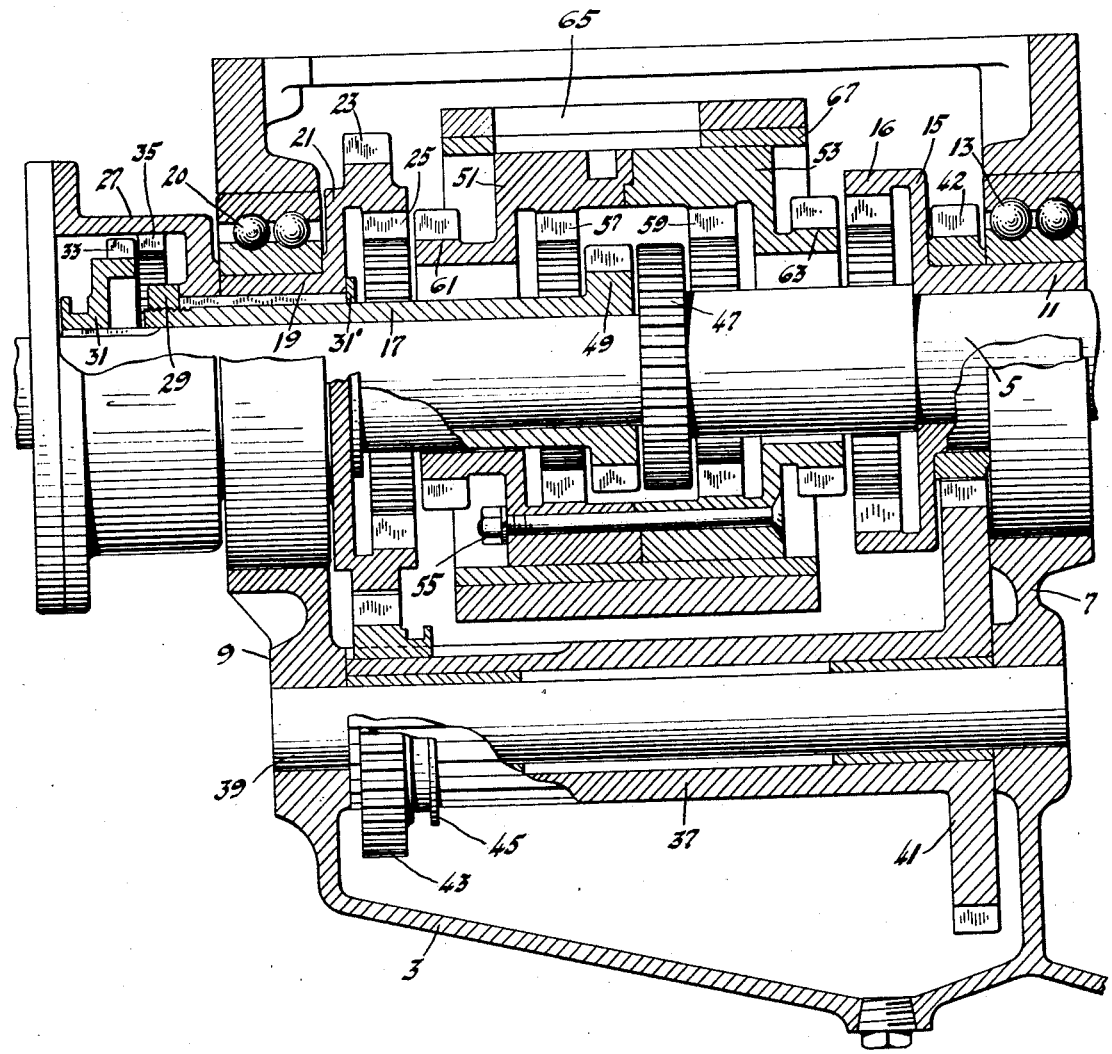

Patented Sept. 10, 1929.

1,727,795

UNITED STATES PATENT OFFICE.

CLAUDE H. STERLING, OF DETROIT, MICHIGAN, ASSIGNOR TO GENERAL MOTORS CORPORATION, OF DETROIT, MICHIGAN, A CORPORATION OF DELAWARE.

OVERGEAR TRANSMISSION.

Application filed January 15, 1927. Serial No. 161,357.

This invention relates to power transmission and has been designed particularly for use on motor vehicles.

The object of the invention is to provide an arrangement giving a quiet power transmission in the three speed ratios most commonly used. A characteristic structural feature of the invention is a slidable gear ring through which certain of the drive ratios are obtained.

The invention will be understood upon reading the following specification and examining the accompanying drawing.

In the drawing the single figure is a longitudinal vertical section.

Referring by reference characters to the drawing, numeral 3 is a transmission housing. A driving shaft 5 extends through the front and rear walls 7 and 9 respectively of the housing. In the front wall the shaft carries a hub 11 rotatable in bearings 13. The hub 11 has a radial flange 15 and an internal gear 16. At the rear wall a sleeve 17 is rotatable about shaft 5. The sleeve 17 carries rigidly a hub 19 rotatable within bearings 20 mounted in the housing wall. The hub 19 has a flange 21 within the bearings 20 and the flange is formed with an external gear 23, and an internal gear 25. Outside the bearing 20 and also positioned on the hub 19 is a cylindrical member 27 to which the propeller shaft may be connected by any preferred means. Suitable fastening means 29 and 31' may be used to retain the parts in position on the hub 19. The end of the driving shaft extends through the member 27 where a collar 31 having clutch teeth 33 is slidably mounted thereon, so that its teeth may be engaged with teeth 35 on the member 27 to effect a direct drive.

A countershaft is shown at 37. It is journalled for rotation about a fixed shaft 39 carried by the front and rear housing walls. It has a spur gear 41 rotatably engaged with a gear 42 carried on hub member 11 between the bearing 13 and the flange 15. Slidably splined on the countershaft is a gear 43 with a collar 45 engaged by a fork not shown. When moved to the position illustrated gear 43 engages gear 23 and drives the member 19, and with it part 27 at low speed. When gear 43 is moved to the right in the figure the gear elements 43 and 23 are disengaged from the driving position. Reverse driving may be accomplished by a reverse idler engaging gears 43 and 23. While it may be otherwise arranged the idler may be a double gear one element of which is always in mesh with gear 23 and its other element is engageable with gear 43 when the latter is moved forwardly from the position shown in the figure, and through a neutral position.

At an intermediate position the driving shaft has a spur gear 47. The sleeve member 17 extends forwardly to a position adjacent gear 47 where it too carries a spur gear 49. Eccentrically surrounding the driving shaft and sleeve is a gear ring formed from two similar parts 51 and 53 united by bolts 55. The two parts have internal gears 57 and 59 near their adjacent edges, and at their ends external gears 61 and 63. The eccentric ring is mounted in a bearing portion 65 of the housing by means of a plain bearing 67. The eccentrically positioned ring is to be moved longitudinally both forwardly and rearwardly from the position illustrated in the drawing. When moved forwardly its gears 57 and 63 engage gears 49 and 16. When in this position it will be seen that the driving shaft drives the gear ring at a somewhat higher speed through a gear train including gears 16 and 63. The gear ring drives the driven sleeve at a somewhat higher speed through a gear train including gears 57 and 59. When in this position therefore, the driven shaft is driven at a speed above that of the driving shaft, there being two upward steps each through a quiet internal-external gear train. When the gear ring is moved to the left from the position illustrated its gears 59 and 61 will engage gears 47 and 25. With the parts in this position it will be seen that two external-internal gear trains constitute the drive between the driving shaft and the driven sleeve and that the gear ratios are such that the driven sleeve is driven at a ratio below that of the driving shaft. It is thus seen that speeds both above and below the speed of the driving shaft may be imparted to the driven shaft by axial movements of the eccentric gear ring, while a direct drive is effected by means of the clutch involving teeth 33 and 35. As already explained the three highest speeds are therefore comparatively noiseless.

Any convenient or preferred means may be employed to reciprocate the clutch member 31, the sliding gear ring, and the sliding countershaft gear for the purpose of making the several gear changes. With the arrangements provided no spur gear trains are used except for the occasionally used low and reverse drive. The transmission is therefore exceedingly quiet and is arranged to be very compact.

I claim:

1. In a transmission, concentric driving and driven shafts, a slidable gear ring, means to drive at two different speeds through said gear ring in two positions of adjustment of said ring there being independent gear trains between said ring and each of said shafts for each of said positions of adjustment.

2. In a transmission, concentric driving and driven shafts, a longitudinally movable ring eccentrically surrounding said shafts, a plurality of cooperating gear trains on said shafts and rings, the gears of said trains engageable in selected positions of adjustment of said ring whereby the driving shaft may drive the driven shaft at at least two driving ratios corresponding to two positions of adjustment of said ring, together with additional means to directly clutch said shafts, the gears of the trains being so proportioned that one drive ratio is above and the other below the ratio obtained by the direct clutch connection.

3. In a transmission device, concentric driving and driven shafts, a longitudinally slidable gear ring, two gears on the gear ring to co-operate selectively with two gears on the driven shaft corresponding to two positions of adjustment of the ring, means to drive the gear ring from the driving shaft in each of said positions of adjustment whereby two driving ratios are obtained for two positions of the slidable ring.

4. In a transmission device, concentric driving and driven shafts, a slidable ring positioned eccentrically about said shafts, a plurality of driving gears on said driving shaft, a plurality of gears on the driven shaft, a plurality of gears on the gear ring to co-operate with the driving and driven shaft gears in each of two positions of adjustment of said ring to give two different speed ratios.

5. The invention defined by claim 4, said gears being of such relative dimensions as to give both an over-gear and an under-gear drive, and additional means to directly clutch said shafts.

6. In a transmission, concentric driving and driven shafts, a countershaft driven by the driving shaft, a slidable gear ring, means independent of the countershaft to drive said driven shaft at two different speeds through said gear ring in two selected positions of adjustment of the latter, means to clutch said shafts for a direct drive, and means to drive said driven shaft from said driving shaft at low speed through said countershaft.

7. The invention defined by claim 6, said last named means including a gear slidable on the countershaft for engagement with a gear on the driven shaft.

8. In a transmission, a driving shaft, a driven shaft, concentrically surrounding said driving shaft, means to clutch said shafts for a direct drive, an eccentric longitudinally slidable ring surrounding said concentric shafts, a plurality of gears on said shafts and ring whereby the ring may be moved to effect a plurality of driving ratios between the driving shaft and driven shaft.

9. In a transmission, a driving shaft having spaced gears and a sliding clutch, a concentric driven sleeve surrounding said driving shaft, means carried by said sleeve to be engaged by said sliding clutch for a direct drive, and a sliding member having means to engage said driving gears in two positions of adjustment to drive the driven sleeve at two predetermined ratios.

10. The invention defined by claim 9, said driven sleeve having a gear adjacent one of said spaced gears of the driving shaft and said slidable member having spaced gears to alternately engage the adjacent gears of the driving shaft and driven sleeve in two positions of adjustment of said member, and other gears on said slidable member to engage gears on said driving shaft and driven sleeve to complete the drive between the shaft and sleeve.

11. In a transmission, a driving shaft having an internal gear and a spaced external gear, a concentric driven shaft having an external gear adjacent said external driving shaft gear and a spaced internal gear, a slidable member having remotely positioned external gears, and internal gears positioned near said adjacent external gears whereby when said slidable member is moved to two positions of adjustment the driven shaft is driven at two predetermined ratios.

12. The invention defined by claim 11, together with additional means to directly clutch said driving shaft and driven shaft when said slidable member is in a neutral position.

13. The invention defined by claim 11, said driven shaft having an additional external gear, a countershaft, gearing to drive the countershaft from the driving shaft, and means on the said countershaft to selectively engage said additional external gear and drive at low speed.

14. In a transmission device, a driving shaft having gears, a driven shaft having gears, each of the gears of one shaft cooperating with an independent one of the gears of the other shaft to constitute pairs, a slidable gear ring movable to a plurality of positions of adjustment and having a plurality of sets of gears for engagement with the gears on said shafts, alternate gear ring gears cooperating with the gears of said pairs on said shafts in each of two positions of adjustment of said slidable gear ring to give two gear ratios between said shafts.

In testimony whereof I affix my signature.

CLAUDE H. STERLING.